United States Patent [19]
Fildan

[11] Patent Number: 6,020,656
[45] Date of Patent: Feb. 1, 2000

[54] SAFETY BATTERY TERMINAL AND SYSTEM

[76] Inventor: Paul Fildan, 22 Godley Road Earlsfield, Wandsworth, London, United Kingdom, SW18 3HD

[21] Appl. No.: 09/010,747

[22] Filed: Jan. 22, 1998

[51] Int. Cl.[7] .................................................. B60K 28/14
[52] U.S. Cl. .......................... 307/10.7; 480/282; 361/93; 361/102; 340/436
[58] Field of Search .................................. 307/10.1, 10.7, 307/9.1; 361/93, 100, 101, 102; 280/73 S; 180/282; 429/150; 340/436

[56] References Cited

U.S. PATENT DOCUMENTS

| | | | |
|---|---|---|---|
| 4,798,968 | 1/1989 | Deem | 307/10.7 |
| 5,034,620 | 7/1991 | Cameron | 307/10.7 |
| 5,449,957 | 9/1995 | Carlo | 307/10.3 |
| 5,535,842 | 7/1996 | Richter et al. | 180/279 |
| 5,612,659 | 3/1997 | Kerber | 335/177 |
| 5,818,122 | 10/1998 | Miyazazawa | 307/10.7 |

*Primary Examiner*—Albert W. Paladini

[57] ABSTRACT

A new safety battery terminal and system for eliminating electrical power in event of an auto accident. The inventive device includes a metal clamp block dimensioned for coupling with a battery terminal of a battery. A terminal body is provided that is adapted for coupling with an electrical output line of an automobile's electrical system. The terminal body is positionable in alignment with the exterior wall of the clamp block. A fusible link is positioned between the clamp block and the terminal body.

13 Claims, 2 Drawing Sheets

SAFETY BATTERY TERMINAL AND SYSTEM

BACKGROUND OF THE INVENTION

1. Field of the Invention

The present invention relates to electrical switches and more particularly pertains to a new safety battery terminal and system for eliminating electrical power in event of an auto accident.

2. Description of the Prior Art

The use of electrical switches is known in the prior art. More specifically, electrical switches heretofore devised and utilized are known to consist basically of familiar, expected and obvious structural configurations, notwithstanding the myriad of designs encompassed by the crowded prior art which have been developed for the fulfillment of countless objectives and requirements.

Known prior art electrical switches include U.S. Pat. No. 5,034,620 to Cameron; U.S. Pat. No. 5,120,617 to Cameron; U.S. Pat. No. 4,798,968 to Deem; U.S. Pat. No. 4,176,284 to Higgs; U.S. Pat. No. 4,591,675 to Sessum; and U.S. Pat. No. Des. 359,948 to Merlin.

While these devices fulfill their respective, particular objectives and requirements, the aforementioned patents do not disclose a new safety battery terminal and system. The inventive device includes a metal clamp block dimensioned for coupling with a battery terminal of a battery. A terminal body is provided that is adapted for coupling with an electrical output line of an automobile's electrical system. The terminal body is positionable in alignment with the exterior wall of the clamp block. A fusible link is positioned between the clamp block and the terminal body.

In these respects, the safety battery terminal and system according to the present invention substantially departs from the conventional concepts and designs of the prior art, and in so doing provides an apparatus primarily developed for the purpose of eliminating electrical power in event of an auto accident.

SUMMARY OF THE INVENTION

In view of the foregoing disadvantages inherent in the known types of electrical switches now present in the prior art, the present invention provides a new safety battery terminal and system construction wherein the same can be utilized for eliminating electrical power in event of an auto accident.

The general purpose of the present invention, which will be described subsequently in greater detail, is to provide a new safety battery terminal and system apparatus and method which has many of the advantages of the electrical switches mentioned heretofore and many novel features that result in a new safety battery terminal and system which is not anticipated, rendered obvious, suggested, or even implied by any of the prior art electrical switches, either alone or in any combination thereof.

To attain this, the present invention generally comprises a metal clamp block dimensioned for coupling with a battery terminal of a battery. The clamp block has a generally square configuration. The clamp block has a cylindrical opening therethrough for receiving the battery terminal. The cylindrical opening has a radial extending opening extending outwardly of an interior wall thereof. An exterior wall of the clamp block has a slot extending inwardly thereof. A terminal body is adapted for coupling with an electrical output line of an automobile's electrical system. The terminal body has a generally rectangular configuration. An exterior wall of the terminal body has an aperture directed therethrough for receiving the electrical output line. An interior wall of the terminal body has a slot extending inwardly thereof. The interior wall is positionable in alignment with the exterior wall of the clamp block. A fusible link is positioned between the exterior wall of the clamp block and the interior wall of the terminal body. The fusible link has a pair of tab portions on opposing free ends thereof. A first tab portion extends inwardly of the slot in the exterior wall of the clamp block. A second tab portion extends inwardly of the slot in the interior wall of the terminal body. A cover plate is provided that is dimensioned for covering upper surfaces of the clamp block, terminal body and the fusible link. The cover plate has a plurality of countersunk apertures therethrough aligning with apertures in the upper surface of the clamp block and terminal body for receiving screws therein.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new safety battery terminal and system apparatus and method which has many of the advantages of the electrical switches mentioned heretofore and many novel features that result in a new safety battery terminal and system which is not anticipated, rendered obvious, suggested, or even implied by any of the prior art electrical switches, either alone or in any combination thereof.

It is another object of the present invention to provide a new safety battery terminal and system which may be easily and efficiently manufactured and marketed.

It is a further object of the present invention to provide a new safety battery terminal and system which is of a durable and reliable construction.

An even further object of the present invention is to provide a new safety battery terminal and system which is susceptible of a low cost of manufacture with regard to both materials and labor, and which accordingly is then susceptible of low prices of sale to the consuming public, thereby making such safety battery terminal and system economically available to the buying public.

Still yet another object of the present invention is to provide a new safety battery terminal and system which provides in the apparatuses and methods of the prior art some of the advantages thereof, while simultaneously overcoming some of the disadvantages normally associated therewith.

Still another object of the present invention is to provide a new safety battery terminal and system for eliminating electrical power in event of an auto accident.

Yet another object of the present invention is to provide a new safety battery terminal and system which includes a metal clamp block dimensioned for coupling with a battery terminal of a battery. A terminal body is provided that is adapted for coupling with an electrical output line of an automobile's electrical system. The terminal body is positionable in alignment with the exterior wall of the clamp block. A fusible link is positioned between the clamp block and the terminal body.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
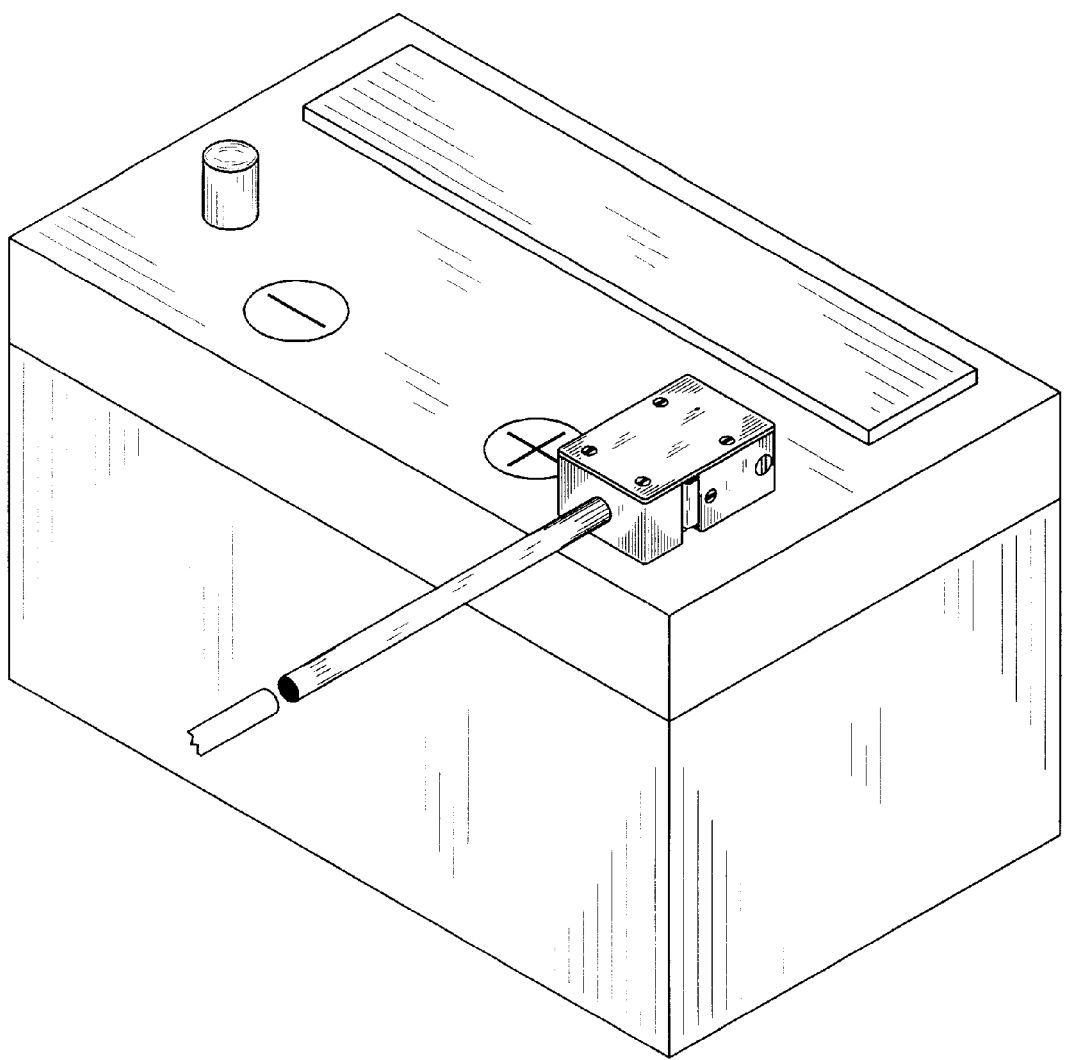
FIG. 1 is a perspective view of a new safety battery terminal nd system according to the present invention illustrated as secured to a battery.
Figure 2:
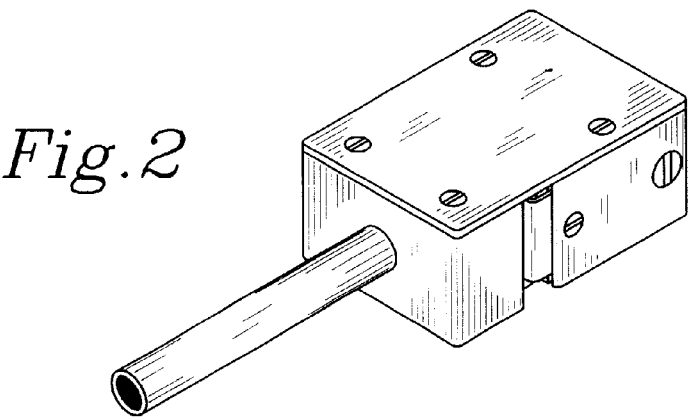
FIG. 2 is a perspective view of the present invention as hown in FIG. 1.
Figure 3:
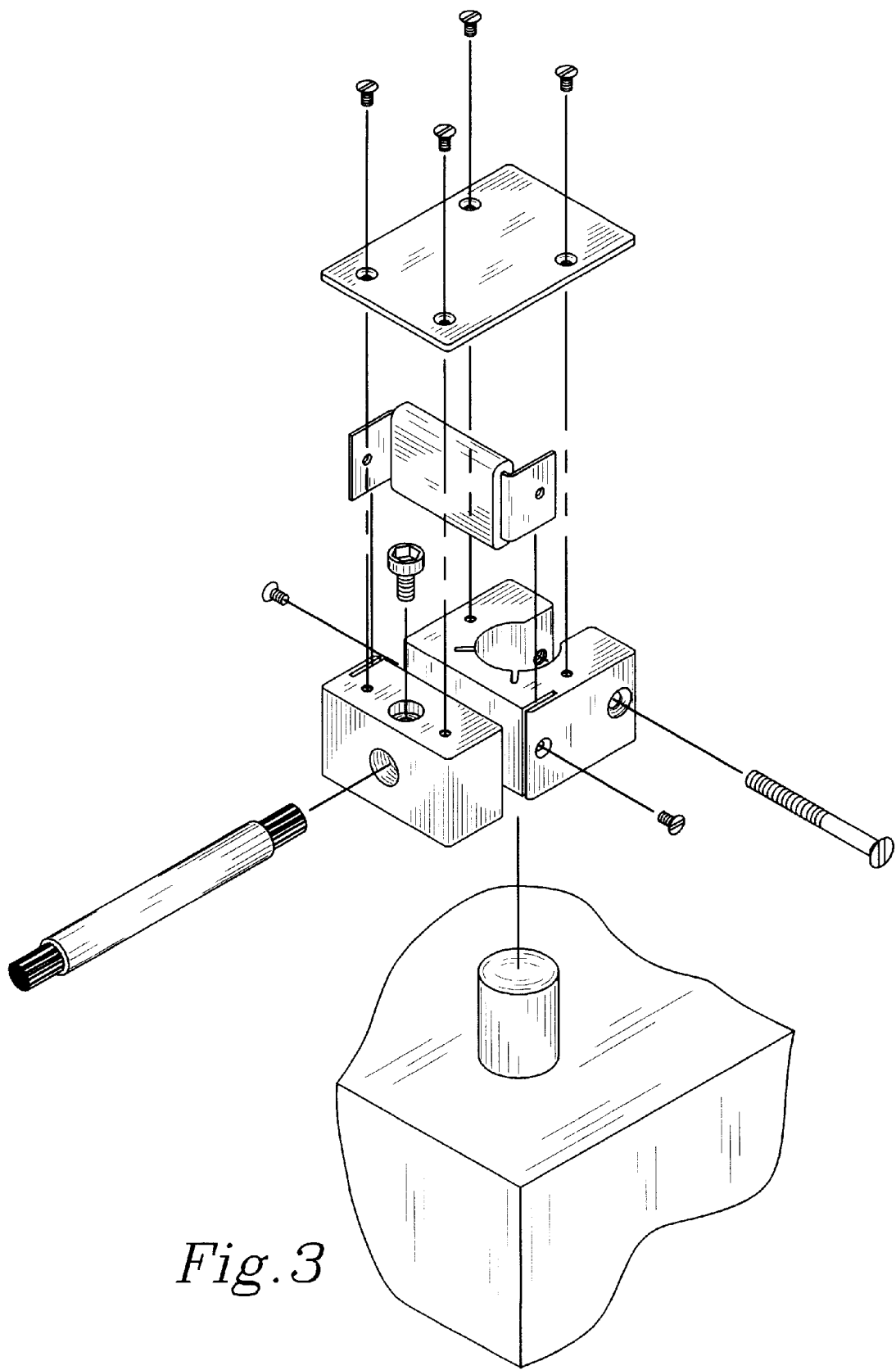
FIG. 3 is an exploded perspective view of the present invention.

With reference now to the drawings, and in particular to FIGS. 1 through 3 thereof, a new safety battery terminal and system embodying the principles and concepts of the present invention and generally designated by the reference numeral 10 will be described.

As best illustrated in FIGS. 1 through 3, the safety battery terminal and system 10 comprises a metal clamp block 12 dimensioned for coupling with a battery terminal 14 of a battery 16. The clamp block 12 has a generally square configuration. The clamp block 12 has a cylindrical opening 18 therethrough for receiving the battery terminal 14. The cylindrical opening 18 has a radial extending opening 20 extending outwardly of an interior wall thereof. An aperture 22 extends through the clamp block 12 whereby a bolt 24 can extend therethrough to facilitate securement of the clamp block 12 to the battery terminal 14. An exterior wall of the clamp block 12 has a slot 26 extending inwardly thereof. The clamp block 12 can be coupled with either the negative or positive terminal 14.

A terminal body 28 is adapted for coupling with an electrical output line 30 of an automobile's electrical system. The terminal body 28 has a generally rectangular configuration. An exterior wall of the terminal body 28 has an aperture 32 directed therethrough for receiving the electrical output line 30. An interior wall of the terminal body has a slot 34 extending inwardly thereof. The interior wall is positionable in alignment with the exterior wall of the clamp block 12.

A fusible link 36 is positioned between the exterior wall of the clamp block 12 and the interior wall of the terminal body 28. The fusible link 36 has a pair of tab portions on opposing free ends thereof. A first tab portion 38 extends inwardly of the slot 26 in the exterior wall of the clamp block 12. A second tab portion 40 extends inwardly of the slot 34 in the interior wall of the terminal body 28.

A cover plate 42 is provided that is dimensioned for covering upper surfaces of the clamp block 12, terminal body 28 and the fusible link 36. The cover plate 42 has a plurality of countersunk apertures 44 therethrough aligning with apertures 46 in the upper surface of the clamp block 12 and terminal body 28 for receiving screws 48 therein.

The underlying concept of the device 10 is that the shortest distance from the battery 16 would be the best place to isolate it. In the event of a mishap or accident in which the battery's power output cable touches the car body, ground, or chassis, the fusible link 36 would blow. This would prevent the battery 16 from generating any more current. It would basically result in the disconnecting of the entire electrical system linked to the battery 16 so an electrical fire does not occur. Alternately, a car sensor would blow the fusible link 36 automatically in the event of a crash, preventing the risk of a fire before one exists. This could employ an airbag-type sensor that activates a relay closing the safety circuit and blowing the fusible link 36. For added safety, the alternator cable directed to the battery 16 could be connected to the unfused side of the terminal body 28. In an accident in which the sensor has activated the relay and caused the circuit to blow, all energy potentially generated by the alternator would be isolated from the car's electrical system.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A new safety battery terminal and system for eliminating electrical power in event of an auto accident comprising, in combination:

a metal clamp block dimensioned for coupling with a battery terminal of a battery, the clamp block having a generally square configuration, the clamp block having a cylindrical opening therethrough for receiving the battery terminal, the cylindrical opening having a radial extending opening extending outwardly of an interior wall thereof, an exterior wall of the clamp block having a slot extending inwardly thereof;

a terminal body adapted for coupling with an electrical output line of an automobile's electrical system, the terminal body having a generally rectangular configuration, an exterior wall of the terminal body having an aperture directed therethrough for receiving the electrical output line, an interior wall of the terminal body having a slot extending inwardly thereof, the interior wall positionable in alignment with the exterior wall of the clamp block;

a fusible link positioned between the exterior wall of the clamp block and the interior wall of the terminal body, the fusible link having a pair of tab portions on opposing free ends thereof, a first tab portion extending inwardly of the slot in the exterior wall of the clamp block, a second tab portion extending inwardly of the slot in the interior wall of the terminal body; and a cover plate dimensioned for covering upper surfaces of the clamp block, terminal body and the fusible link, the cover plate having a plurality of countersunk apertures therethrough aligning with apertures in the upper surface of the clamp block and terminal body for receiving screws therein.

2. A new safety battery terminal and system for eliminating electrical power in event of an auto accident comprising, in combination:

a metal clamp block dimensioned for coupling with a battery terminal of a battery;

a terminal body adapted for coupling with an electrical output line of an automobile's electrical system, the terminal body positionable in alignment with the exterior wall of the clamp block;

a fusible link positioned between the clamp block and the terminal body;

a cover plate dimensioned for covering upper surfaces of the clamp block, terminal body and the fusible link.

3. The safety battery terminal and system as set forth in claim 2 wherein the cover plate has a plurality of countersunk apertures therethrough aligning with apertures in the upper surface of the clamp block and terminal body for receiving screws therein.

4. The safety battery terminal and system as set forth in claim 2 wherein the clamp block has a cylindrical opening therethrough for receiving the battery terminal.

5. The safety battery terminal and system as set forth in claim 4 wherein the cylindrical opening has a radial extending opening extending outwardly of an interior wall thereof.

6. The safety battery terminal and system as set forth in claim 2 wherein an exterior wall of the terminal body has an aperture directed therethrough for receiving the electrical output line.

7. The safety battery terminal and system as set forth in claim 2 wherein the fusible link has a pair of tab portions on opposing free ends thereof, a first tab portion extending inwardly of a slot in an exterior wall of the clamp block, a second tab portion extending inwardly of a slot in an interior wall of the terminal body.

8. A new safety battery terminal and system for eliminating electrical power in event of an auto accident comprising, in combination:

a metal clamp block dimensioned for coupling with a battery terminal of a battery;

a terminal body adapted for coupling with an electrical output line of an automobile's electrical system, the terminal body positionable in alignment with the exterior wall of the clamp block;

a fusible link positioned between the clamp block and the terminal body; the fusible link has a pair of tab portions on opposing free ends thereof, a first tab portion extending inwardly of a slot in an exterior wall of the clamp block, a second tab portion extending inwardly of a slot in an interior wall of the terminal body.

9. The safety battery terminal and system as set forth in claim 8 and further including a cover plate dimensioned for covering upper surfaces of the clamp block, terminal body and the fusible link.

10. The safety battery terminal and system as set forth in claim 9 wherein the cover plate has a plurality of countersunk apertures therethrough aligning with apertures in the upper surface of the clamp block and terminal body for receiving screws therein.

11. The safety battery terminal and system as set forth in claim 8 wherein the clamp block has a cylindrical opening therethrough for receiving the battery terminal.

12. The safety battery terminal and system as set forth in claim 8 wherein the cylindrical opening has a radial extending opening extending outwardly of an interior wall thereof.

13. The safety battery terminal and system as set forth in claim 8 wherein an exterior wall of the terminal body has an aperture directed therethrough for receiving the electrical output line.

* * * * *